United States Patent
Wang et al.

(10) Patent No.: US 11,401,480 B2
(45) Date of Patent: Aug. 2, 2022

(54) THIN-WALL BONDED SELF-LUBRICATING PLATE

(71) Applicant: MINGYANG TECHNOLOGY (SUZHOU) CO., LTD., Jiangsu (CN)

(72) Inventors: Mingxiang Wang, Jiangsu (CN); Hu Zhao, Jiangsu (CN); Jianxiong Ni, Jiangsu (CN)

(73) Assignee: MINGYANG TECHNOLOGY (SUZHOU) CO., LTD., Jiangsu (CN)

( * ) Notice: Subject to any disclaimer, the term of this patent is extended or adjusted under 35 U.S.C. 154(b) by 0 days.

(21) Appl. No.: 17/292,444

(22) PCT Filed: Jul. 10, 2019

(86) PCT No.: PCT/CN2019/095376
§ 371 (c)(1),
(2) Date: May 9, 2021

(87) PCT Pub. No.: WO2020/237784
PCT Pub. Date: Dec. 3, 2020

(65) Prior Publication Data
US 2021/0324288 A1    Oct. 21, 2021

(30) Foreign Application Priority Data

May 29, 2019  (CN) .......................... 201910459062.1

(51) Int. Cl.
*B32B 15/18*    (2006.01)
*B32B 15/20*    (2006.01)
(Continued)

(52) U.S. Cl.
CPC ............. *C10M 107/38* (2013.01); *B32B 7/12* (2013.01); *B32B 15/18* (2013.01); *B32B 15/20* (2013.01);
(Continued)

(58) Field of Classification Search
CPC .............. C10M 107/38; C10M 113/14; C10M 169/02; C10M 107/04; C10M 2201/126;
(Continued)

(56) References Cited

U.S. PATENT DOCUMENTS

2012/0251021 A1* 10/2012 Swei ...................... C09J 7/201
                                                                384/13
2014/0335336 A1* 11/2014 Wang ..................... B32B 27/20
                                                                428/214

FOREIGN PATENT DOCUMENTS

CN         101126417 A     2/2008
CN         101126418 A     2/2008
(Continued)

OTHER PUBLICATIONS

Machine translation of CN 102827476. (Year: 2012).*
(Continued)

*Primary Examiner* — John D Freeman
(74) *Attorney, Agent, or Firm* — Birch, Stewart, Kolasch & Birch, LLP

(57) ABSTRACT

Disclosed is a thin-wall bonded self-lubricating plate, the composite material structure thereof being composed of a surface self-lubricating layer, an intermediate bonding layer, and a metal backing layer. The surface self-lubricating layer includes polytetrafluoroethylene, ultrahigh molecular weight polyethylene, etc. The surface self-lubricating layer thereof is thicker than an ordinary sintered self-lubricating material, thereby reducing vibration and prolonging the service life. Components, such as bushings, gaskets, sliding plates, composite bearings and other special-shaped members, made of the thin-wall bonded self-lubricating plate, have broad application prospects in low-speed rotation and relative sliding parts of vehicles, general machinery, office furniture, etc.

7 Claims, 1 Drawing Sheet

(51) Int. Cl.
*B32B 27/20* (2006.01)
*B32B 27/32* (2006.01)
*B32B 7/12* (2006.01)
*C10M 107/04* (2006.01)
*C10M 107/38* (2006.01)
*C10M 113/14* (2006.01)
*C10N 50/08* (2006.01)

(52) U.S. Cl.
CPC ............ *B32B 27/20* (2013.01); *B32B 27/322* (2013.01); *C10M 107/04* (2013.01); *C10M 113/14* (2013.01); *B32B 2262/101* (2013.01); *B32B 2307/554* (2013.01); *B32B 2307/746* (2013.01); *C10M 2205/0225* (2013.01); *C10M 2213/0623* (2013.01); *C10N 2050/08* (2013.01)

(58) Field of Classification Search
CPC ... C10M 2205/0225; C10M 2213/0623; B32B 27/322; B32B 15/18; B32B 15/20; B32B 7/12; B32B 27/20; B32B 2262/101; B32B 2307/554; B32B 2307/746; B32B 15/08; B32B 15/092; B32B 15/095; B32B 27/08; B32B 27/306; B32B 2250/03; B32B 2260/021; B32B 2264/101; B32B 2264/102; B32B 2264/105; B32B 2264/108; B32B 2479/00; B32B 2605/00; B32B 15/082; B32B 27/32; B32B 2307/70; B32B 2581/00; B32B 15/088; B32B 15/098; B32B 27/281; B32B 2307/732; B32B 27/34; B32B 27/38; B32B 27/40; B32B 27/42; B32B 2262/106; B32B 33/00; B32B 15/085; B32B 2260/046; C10N 2050/08; F16C 33/201; F16C 33/208; F16C 2208/60; F16C 2208/78; F16C 2208/32; F16C 2208/82; F16C 2208/86; F16C 2208/90; F16C 33/205
See application file for complete search history.

(56) References Cited

FOREIGN PATENT DOCUMENTS

| | | | |
|---|---|---|---|
| CN | 101328705 | A | 12/2008 |
| CN | 101875736 | A | 11/2010 |
| CN | 102827476 | A * | 12/2012 |
| CN | 207156060 | U | 3/2018 |
| CN | 109334161 | A | 2/2019 |
| CN | 109747239 | A | 5/2019 |

OTHER PUBLICATIONS

Chinese Office Action and Search Report for Chinese Application No. 201910459062.1 dated Aug. 25, 2020 with an English translation (Year: 2020).*

Extended European Search Report for European Application No. 19930738.0 dated Apr. 28, 2022 (Year: 2022).*

Panin et al., "Wear resistance of composites based on hybrid UHMWPE-PTFE matrix: mechanical and tribotechnical properties of the matrix," Journal of Friction and Wear, vol. 36, No. 3, 2015, pp. 249-256.

* cited by examiner

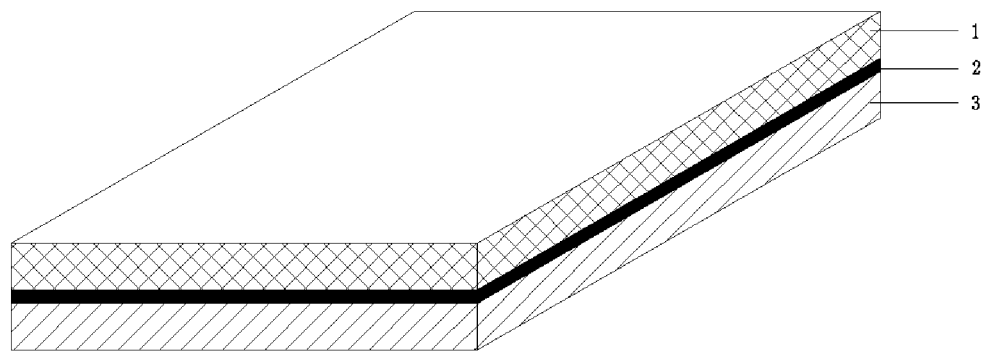

THIN-WALL BONDED SELF-LUBRICATING PLATE

RELATED APPLICATIONS

This is a U.S. national stage of international application No. PCT/CN2019/095376 filed on Jul. 10, 2019, which claims priority to Chinese Patent Application No. 201910459062.1, filed with the China National Intellectual Property Administration (CNIPA) on May 29, 2019, the entire content of which is incorporated herein by reference.

TECHNICAL FIELD

This invention relates to a thin-wall bonded self-lubricating plate, and more particularly, to a composition of materials of and a configuration of the self-lubricating plate.

BACKGROUND ART

At present, most of the self-lubricating composite plates available in the market are sintered self-lubricating plates composed of a modified polymer plastic layer, intermediate copper powder (or a metal mesh) and a metal backing. The intermediate copper powder layer (or the metal mesh) has to be bonded with the metal backing through sintering, which requires a long process, low efficiency, and high energy consumption, in addition to pollution to the environment. A part or component made of the self-lubricating composite plate is thin in its self-lubricating layer, defective in elasticity, inferior in shock absorption and noise reduction performance, and poor in wear resistance; as a result, the self-lubricating layer is easy to fall off when assembled and short in service life, with frequent abnormal sounds.

SUMMARY OF THE INVENTION

It is an object of the invention to address the above problem by providing a thin-wall bonded self-lubricating plate composed of a surface self-lubricating layer, an intermediate bonding layer and a metal backing, wherein mainly the constituents of the surface self-lubricating layer are proportioned and adjusted. A plate including the adjusted surface self-lubricating layer features thick coating and satisfies the performance requirements, such as interference assembly, shock absorption and noise reduction, of customers. Such a plate has high peeling resistance, so that the surface self-lubricating layer is kept from being damaged when a part or component made of the plate is assembled; moreover, the plate has the advantages of the short manufacturing process, high efficiency, low energy consumption, good wear resistance and no pollution to the environment.

To solve the above technical problem, the invention provides the following technical solution:

a thin-wall bonded self-lubricating plate, consisting of a surface self-lubricating layer, an intermediate bonding layer, and a metal backing, wherein the surface self-lubricating layer includes polytetrafluoroethylene and ultrahigh molecular weight polyethylene.

Preferably, in the surface self-lubricating layer, a weight ratio of the polytetrafluoroethylene to the ultrahigh molecular weight polyethylene is 1-60: 1-40, specifically 40:40, 50:30, 60:20, 70:10, etc.

Preferably, the surface self-lubricating layer further includes one or more of graphite, carbon powder, carbon fiber powder, metal powder, glass fiber powder, titanium dioxide powder and organic polymer materials, preferably, the surface self-lubricating layer further includes the glass fiber powder.

Preferably, a weight ratio of the polytetrafluoroethylene to the ultrahigh molecular weight polyethylene and the glass fiber powder in the surface self-lubricating layer is 65:15:20.

More preferably, the weight ratio of the polytetrafluoroethylene to the ultrahigh molecular weight polyethylene and the glass fiber powder in the surface self-lubricating layer is 65:15:20.

Preferably, the intermediate bonding layer is a thermosetting polymer bonding material or a thermoplastic polymer bonding material.

Preferably, the thermosetting polymer bonding material is an epoxy resin, a phenolic resin, or a thermosetting polyimide resin.

Preferably, the thermoplastic polymer bonding material is an ethylene vinyl acetate resin, a polyurethane resin, a polyamide resin, or an organic fluorine resin.

Preferably, the metal backing is a cold-rolled steel plate, an aluminum alloy plate, or a copper alloy plate.

Preferably, the surface self-lubricating layer may be prepared using conventional film-making methods, preferably by 1, taking polymer plastic powder with self-lubricating effects added with or without a modified substance, manufacturing a cylinder through mold pressing, sintering and molding, and then conducting turning, or 2, taking polymer plastic powder with self-lubricating effects added with or without a modified substance, and preparing through an extrusion casting process.

The surface self-lubricating layer has a thickness preferably of 0.1 mm to 0.5 mm.

The surface self-lubricating layer further includes modified substances including but not limited to, graphite, carbon powder, carbon fiber powder, metal powder and other powder materials with electric conductivity, to prepare a conductive film; non-conductive films are made by adding materials including but not limited to glass fiber powder, titanium dioxide, organic polymeric materials, and other non-conductive powder materials.

The intermediate bonding layer has a first form of a thermosetting polymer bonding material, commonly including but not limited to an epoxy resin, a phenolic resin, a thermosetting polyimide resin, and the like, and a second form of thermoplastic polymeric bonding material, commonly including but not limited to an ethylene vinyl acetate resin, a polyurethane resin, a polyamide resin, an organic fluorine resin and the like.

The intermediate bonding layer has a thickness of 0.01 mm to 0.1 mm.

The metal backing includes but is not limited to a cold-rolled steel plate, an aluminum alloy plate and a copper alloy plate, and all the bonding surface of the cold-rolled metal plate has to be subjected to surface activation; methods of activation includes, but is not limited to, surface chemical coating or physical blasting.

The metal backing has a thickness of 0.1 mm to 2.0 mm.

The multi-constitutional surface self-lubricating layer formed by compounding a plurality of polymer materials proportioned accordingly has good wear resistance, friction coefficient, etc. The thin-wall bonded self-lubricating plate formed in part with the multi-constitutional surface self-lubricating layer shows excellent properties of composite materials such as thin wall (as thin as 0.25 mm in the thinnest portion), light weight, etc. The thin wall reduces the volume of a mechanical mechanism, the light weight further reduces the weight of the mechanical mechanism, the vibration can be reduced, and the service life is prolonged.

Components, such as bushings, gaskets, sliding plates, composite bearings and other special-shaped members, made of the thin-wall bonded self-lubricating plate, have broad application prospects in low-speed rotation and relative sliding parts of vehicles, general machinery, office furniture, etc.

This invention is advantageous in that:

in the thin-wall bonded self-lubricating plate of this invention, the constituents of the surface self-lubricating layer in the plate are selected and proportioned so that the thin-wall bonded self-lubricating plate has high peeling resistance, and the surface self-lubricating layer is kept from being damaged when a part or component made of the plate is assembled; moreover, the plate has the advantages of the short manufacturing process, high efficiency, low energy consumption, good wear resistance and no pollution to the environment; more importantly, the thin-wall bonded self-lubricating plate of this invention has a smaller wear width as small as 3.98 mm, and a smaller friction coefficient as small as 0.185.

about 30 MPa to prepare a cylindrical blank, the cylindrical blank was sintered at about 380° C. and was finally subjected to rotary cutting to obtain a film with a thickness of 0.25 mm, i.e., a surface self-lubricating layer. Performance Test: the surface self-lubricating layer films prepared in Examples 1-6 were tested for wear resistance and friction coefficient, and the friction and wear properties were tested according to National Standard GB-3960. The test results are shown in Table 1 below:

TABLE 1

Test Results for Examples 1-6

| Example No. | Polytetrafluoroethylene powder (parts by weight) | Ultrahigh molecular weight polyethylene powder (parts by weight) | Glass fiber powder (parts by weight) | Wear width/ mm | Friction Coefficient |
| --- | --- | --- | --- | --- | --- |
| 1 | 40 | 40 | 20 | 4.38 | 0.241 |
| 2 | 45 | 35 | 20 | 4.12 | 0.215 |
| 3 | 50 | 30 | 20 | 4.18 | 0.198 |
| 4 | 55 | 25 | 20 | 4.24 | 0.192 |
| 5 | 60 | 20 | 20 | 4.32 | 0.189 |
| 6 | 65 | 15 | 20 | 3.98 | 0.185 |

As can be seen from Table 1, when the weight ratio of the polytetrafluoroethylene powder to the ultrahigh molecular weight polyethylene powder and the glass fiber powder was 65:15:20, both the wear width and the friction coefficient could reach the lowest values.

Comparative Example 1

The ultrahigh molecular weight polyethylene in Example 1 was replaced by polyetheretherketone powder, and other parameters remained unchanged, and the test results are shown in Table 2 below:

TABLE 2

Test Results for Comparative Example

| | Polytetrafluoroethylene powder (parts by weight) | Polyetheretherketone powder (parts by weight) | Glass fiber powder (parts by weight) | Wear width/ mm | Friction Coefficient |
| --- | --- | --- | --- | --- | --- |
| Comparative Example 1 | 40 | 40 | 20 | 4.26 | 0.262 |

BRIEF DESCRIPTION OF THE DRAWINGS

FIG. 1 is a schematic view showing a structure of a thin-wall bonded self-lubricating plate.

Reference signs: In FIG. 1, 1 denotes a surface self-lubricating layer, 2 denotes an intermediate bonding layer, and 3 denotes a metal backing.

DETAILED DESCRIPTION OF PREFERRED EMBODIMENTS

Examples 1-6

Constituents were weighted and mixed according to a formula, a uniform mixture was subjected to a pressure of Finally, it should be noted that many other variations and modifications are surely possible in light of the above teachings, but it's impossible and not necessary to list all the embodiments herein. Other obvious variations or modifications based on this disclosure shall fall within the scope of the invention.

The invention claimed is:
1. A self-lubricating plate, comprising:
   a surface self-lubricating layer;
   an intermediate bonding layer; and
   a metal backing,
   wherein the surface self-lubricating layer consists of polytetrafluoroethylene, ultrahigh molecular weight polyethylene, and glass fiber powder, and wherein a weight ratio of the polytetrafluoroethylene to the ultrahigh molecular weight polyethylene and the glass fiber powder in the surface self-lubricating layer is 65: 15: 20.

2. The self-lubricating plate according to claim 1, wherein the surface self-lubricating layer comprises a cylinder shape.

3. The self-lubricating plate according to claim 1, wherein the intermediate bonding layer is a thermosetting polymer bonding material or a thermoplastic polymer bonding material.

4. The self-lubricating plate according to claim 3, wherein the thermosetting polymer bonding material is an epoxy resin, a phenolic resin, or a thermosetting polyimide resin.

5. The self-lubricating plate according to claim 3, wherein the thermoplastic polymer bonding material is an ethylene vinyl acetate resin, a polyurethane resin, a polyamide resin, or an organic fluorine resin.

6. The self-lubricating plate according to claim 1, wherein the metal backing is a cold-rolled steel plate, an aluminum alloy plate, or a copper alloy plate.

7. The self-lubricating plate according to claim 1, wherein the surface self-lubricating layer includes an extruded cast film layer.

* * * * *